UNITED STATES PATENT OFFICE 2,249,962

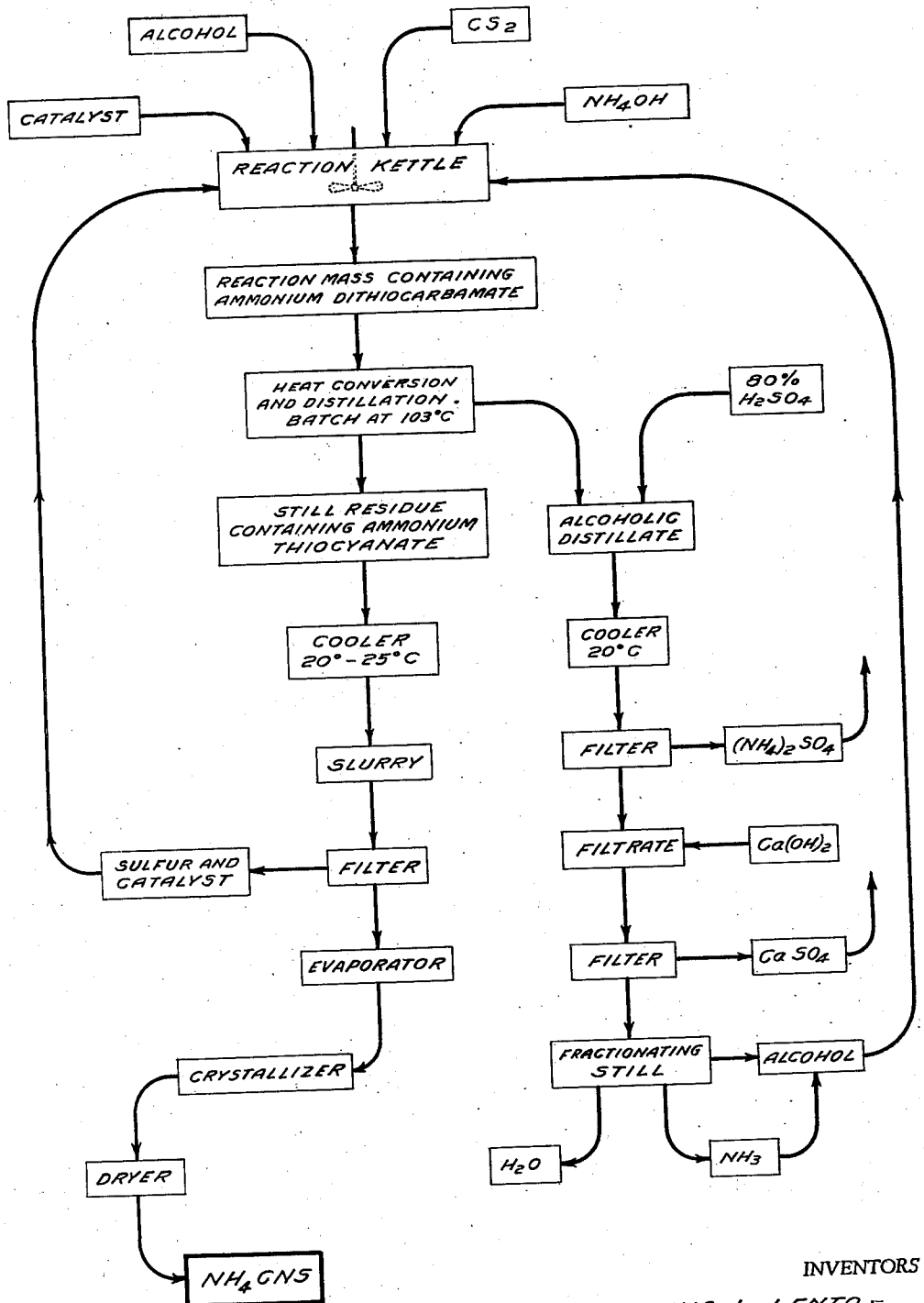

PREPARATION OF AMMONIUM THIO-CYANATE

Louis L. Lento, Jr., Stamford, and David W. Jayne, Jr., Old Greenwich, Conn., assignors to American Cyanamid Company, New York, N. Y., a corporation of Maine Application January 27, 1940, Serial No. 315,892

3 Claims. (Cl. 23—75)

The present invention relates to the production of ammonium thiocyanate.

The manufacture of this material by the primary reaction between $CS_2$ and ammonia in the presence of ethyl alcohol to form ammonium dithiocarbamate, and obtaining a secondary conversion of the latter to thiocyanate through refluxing, is well known although this prior art method requires several days for the complete process to go to completion. Even under these circumstances, a dark colored product is obtained which must be further purified through one or more crystallizations.

The principal object of the present invention is to speed up the process to the point where it may be accomplished in a few hours under such circumstances that a substantially pure product is obtained which may be used as such without recrystallization.

The present invention is based upon the discovery that the primary reaction may be carried out in the presence of a catalyst which reduces the time of reaction from at least 48 hours to approximately 2 hours. The invention further contemplates conversion of the thus formed dithiocarbamate to thiocyanate during a distillation period while the major portion of the alcohol is being removed.

Consequently, the invention in its broadest aspect contemplates reacting carbon bisulfide and ammonia, preferably as ammonium hydroxide, in the presence of a catalyst to hasten the reaction. The preferred catalyst is oleic acid, although any fatty acid or ammonium fatty acid salt is usable. Moreover, the higher alcohols, such as those containing from 4 to 7 carbon atoms, as well as pine oil may be used. The common characteristic of these catalysts is not only that they hasten the reaction but that they are soluble in carbon bisulfide. By subjecting the reaction mixture to a distillation operation where the batch temperature rises to about 103° C., a substantially complete conversion to thiocyanate takes place, while the major portion of the alcohol is removed.

The invention is illustrated in the flow sheet.

Generally speaking, the process comprises placing in a reaction kettle alcohol, ammonium hydroxide, carbon bisulfide and the catalyst. Any alcohol which acts as a solubilizing agent for the carbon bisulfide and a reaction diluent may be used, although ethyl alcohol is preferred. Other alcohols, such as methyl, tertiary butyl, isopropyl or the like have also been found to be satisfactory. 26° Bé. aqueous ammonia is eminently satisfactory for the purpose, although ammonia of other concentrations may be used.

The preferred catalyst is a fatty acid and specifically oleic acid. Where a fatty acid is the catalyst, an excess of ammonia must be used over that necessary to saponify the fatty acid and to combine with the carbon bisulfide. Where an alcohol is used as the catalyst, an excess of ammonia over that necessary to react with the carbon bisulfide is required.

Upon agitating the reaction mixture so as to break up the two layers which would normally form, a reaction begins which has been found to be substantially complete in two hours. A simultaneous experiment run without oleic acid or other catalyst showed that the reaction was incomplete at the end of 48 hours.

The reaction mixture containing ammonium dithiocarbamate and the diluent alcohol is then distilled. By the time the batch temperature reaches 103° C., at which time most, if not all, of the alcohol has passed over, the dithiocarbamate has been converted to thiocyanate. The residue from the still is cooled and then filtered to remove sulfur and the catalyst.

The catalyst, initially with a small quantity of contaminating sulfur, is then returned to the cycle. After several passes and when the sulfur content has built up to an undesirable point, the entire filter cake is discarded and a fresh batch of catalyst used.

The filtrate from the sulfur and catalyst removal step is evaporated and then cooled to a crystallizing temperature. The resulting crystals of ammonium thiocyanate are then dried and packaged. Analysis shows that a product thus prepared analyzes over 95% ammonium thiocyanate, the only major impurity being water.

The distillate from the fractionation of the contents of the reaction kettle contains desirable quantities of alcohol. The process may be made cyclic by recovering these values.

One such method of recovery may consist in adding 80% sulfuric acid to the distillate in order to decompose the $(NH_4)_2S$ therein. Upon cooling the solution to say 20° C., crystals of ammonium sulfate will be precipitated, which may be recovered. The filtrate from this operation still contains some contaminating quantities of ammonium sulfate. By adding a quantity of hydrated lime thereto, this contaminant is removed as calcium sulfate. The remaining mixture of alcohol and water may then be fractionated, the alcohol being returned to the cycle, or the alcohol-water mixture may first be saturated with NH₃ and then returned.

As a specific example of a process carried out according to the present invention, the reaction kettle was charged with 150 pounds of ethyl alcohol, 100 pounds of carbon bisulfide, 200 pounds of aqueous ammonia of 26° Bé. and 5 pounds of oleic acid. By charging the raw materials into the kettle in the order named, carbon bisulfide losses are avoided. After charging, the contents of the kettle were agitated and the reaction began. Exothermic heat carried the temperature to approximately 43° C. While after charging a two layer system existed, upon completion of the reaction, the contents of the kettle was homogeneous. This homogeneity is indicative of the completeness of the reaction.

At this point, the contents of the kettle were distilled until the temperature of the batch reached approximately 103° C. At this point, not only had the alcohol been removed, but the dithiocarbamate had been converted to thiocyanate. The still residue was then cooled to from 20 to 25° C. and discharged to a filter. The filter cake was predominantly sulfur and ammonium oleate. The filtrate was evaporated until the batch temperature reached 110° to 115° C., whereupon it was permitted to cool and the crop of ammonium thiocyanate crystals recovered. As an alternative procedure, the filtrate may be evaporated to dryness to recover a crop of crude thiocyanate. For this modification, a temperature of 130° C. need not be exceeded. It is important during the evaporation that an ammonium thiocyanate decomposition temperature be avoided. 130° C. is well below this point.

The values in the alcoholic distillate were recovered by adding thereto 80% sulfuric acid with agitation until the pH of the batch was 3.3. Upon cooling to 20° C., a copious crop of ammonium sulfate crystallized therefrom which was removed by filtration. A quantity of calcium hydroxide was added to the filtrate in slight excess over that required to combine with its residual ammonium sulfate and the thus formed calcium sulfate removed by filtration. Fractionation of the filtrate recovered 95% alcohol which was returned to the cycle.

The ammonium thiocyanate may either be recovered as crystals or used in solution form.

Alkali metal thiocyanates may be produced from either the crystals or solution by metathetical reaction with the corresponding alkali metal carbonate or hydroxide. In the case of the former, ammonia and carbon dioxide are liberated while in the latter, ammonia and water are generated. Where desired, the ammonia and water may be returned to the cycle.

Products prepared from the above method, when analyzed, were found to be better than 98% alkali metal thiocyanates.

In much the same manner, alkaline earth thiocyanates may be formed by metathetical reaction between the ammonium thiocyanate and the corresponding alkaline earth hydroxide. Such thiocyanates analyzed 98% pure.

While the invention has been described and shown with particular reference to specific embodiments, it is to be understood that it is not to be limited thereto but is to be construed broadly and restricted solely by the scope of the appended claims.

We claim:

1. A method of making ammonium thiocyanate which includes the steps of reacting carbon bisulfide and ammonia in the presence of a reaction diluent comprising an aliphatic alcohol which will solubilize the carbon bisulfide and a catalyst chosen from the group consisting of a fatty acid and the ammonium salts thereof, and heat-converting the dithiocarbamate to thiocyanate.

2. A method of making ammonium thiocyanate which comprises reacting carbon bisulfide with ammonium hydroxide in the presence of ethyl alcohol and ammonium oleate and heat-converting the dithiocarbamate to thiocyanate in which the major portion of the alcohol is distilled from the reaction mixture during the heat conversion step, recovering ammonium thiocyanate from the still residue, removing (NH₄)₂S from the distillate and returning a quantity of the thus purified alcoholic distillate to the reaction kettle.

3. A method of making ammonium thiocyanate which comprises reacting carbon bisulfide with ammonium hydroxide in the presence of ethyl alcohol and ammonium oleate and heat-converting the dithiocarbamate to thiocyanate in which the major portion of the alcohol is distilled from the reaction mixture during the heat conversion step, recovering ammonium thiocyanate from the still residue, removing (NH₄)₂S from the distillate and saturing the distillate with NH₃ and returning the same to the cycle.

LOUIS L. LENTO, JR.
DAVID W. JAYNE, JR.